United States Patent
Oeckl et al.

(10) Patent No.: US 10,134,156 B2
(45) Date of Patent: Nov. 20, 2018

(54) METHOD AND EVALUATION DEVICE FOR EVALUATING PROJECTION DATA OF AN OBJECT BEING EXAMINED

(71) Applicants: Fraunhofer-Gesellschaft zur Förderung der angewandten Forschung e.V., München (DE); Universität des Saarlandes, Saarbrücken (DE)

(72) Inventors: Steven Oeckl, Erlangen (DE); Alfred K. Louis, Saarbrücken (DE); Tobias Schön, Nürnberg (DE)

(73) Assignees: Fraunhofer-Gesellschaft zur Förderung der angewandten Forschung e.V., München (DE); Universität des Saarlandes, Saarbrücken (DE)

( * ) Notice: Subject to any disclaimer, the term of this patent is extended or adjusted under 35 U.S.C. 154(b) by 28 days.

(21) Appl. No.: 15/319,587

(22) PCT Filed: Jun. 16, 2015

(86) PCT No.: PCT/EP2015/063452
§ 371 (c)(1),
(2) Date: Dec. 16, 2016

(87) PCT Pub. No.: WO2015/193296
PCT Pub. Date: Dec. 23, 2015

(65) Prior Publication Data
US 2017/0323461 A1  Nov. 9, 2017

(30) Foreign Application Priority Data

Jun. 17, 2014 (DE) .................... 10 2014 211 634

(51) Int. Cl.
*G06T 11/00* (2006.01)

(52) U.S. Cl.
CPC .. *G06T 11/006* (2013.01); *G06T 2207/20068* (2013.01); *G06T 2211/416* (2013.01); *G06T 2211/421* (2013.01); *H05K 999/99* (2013.01)

(58) Field of Classification Search
CPC ......... G06T 11/006; G06T 2207/20068; G06T 2211/416; G06T 2211/421
See application file for complete search history.

(56) References Cited

U.S. PATENT DOCUMENTS

| 6,151,377 A * | 11/2000 | Nilsson ................. G06T 11/006 378/4 |
| 2009/0196393 A1* | 8/2009 | Wang .................... G06T 11/006 378/4 |
| 2016/0223475 A1* | 8/2016 | Palamodov ........... G06T 11/006 |

OTHER PUBLICATIONS

P. Grangeat in G. T. Herman, A. K. Louis and F. Natterer, "Mathematical framework of cone-beam reconstruction via the first derivative of the radon transform", Editors, Lecture Notes in Mathematics, vol. 1497, pp. 66 to 97, Springer 1991.

(Continued)

*Primary Examiner* — Siamak Harandi
(74) *Attorney, Agent, or Firm* — McGlew and Tuttle, P.C.

(57) ABSTRACT

In a method and an evaluation device for the evaluation of projection data of an object being examined, which are determined along a trajectory in a multiplicity of projection positions relative to a co-ordinate origin, a particular trajectory function is determined for the projection positions, for each of a multiplicity of positions from a reconstruction region of dimension n by establishing an offset (d) and a direction vector at the co-ordinate origin, establishing a hyperplane of dimension n−1 which runs perpendicular to the direction vector and has an offset to the co-ordinate origin, establishing a number of intersection points where the hyperplane intersects the trajectory, establishing a derivative vector of the trajectory according to its trajectory (Continued)

path and calculating the derivative vector in the projection position, and establishing an absolute value of a scalar product between the derivative vector and the position and dividing the absolute value by the number. The determined trajectory functions are transformed to a frequency domain of dimension n and the projection data are evaluated by means of the transformed trajectory functions.

19 Claims, 10 Drawing Sheets

(56) References Cited

OTHER PUBLICATIONS

A. Katsevich, "A general scheme for constructing inversion algorithms for cone beam ct.", International Journal of Mathematics and Mathematical Sciences, 2003 (21): 1305 to 1321, 2003.
Steven Oeckl, "New Inversion Formula for the X-ray transform and its Application to CT Reconstruction", Mathematics and Algorithms in Tomography, Aug. 10, 2014 (Aug. 10, 2014), pp. 2076-2078, XP055207826, DOI: 10.4171/OWR/2014/37.
Alexander Katsevich, "An improved exact filtered backprojection algorithm for spiral computed tomography", Advances in Applied Mathematics, Bd. 32, Nr. 4, May 2004 (May 2004), pp. 681-697, XP055207855, ISSN: 0196-8858, DOI: 10.1016/S0196-8858(03)00099-X, pp. 692-694.
Dennerlein, F. et al., Exact and efficient cone-beam reconstruction algorithm or a short-scan circle combined with various lines. In: Proceedings of SPIE 5747, Medical Imaging (2005). 388.

* cited by examiner

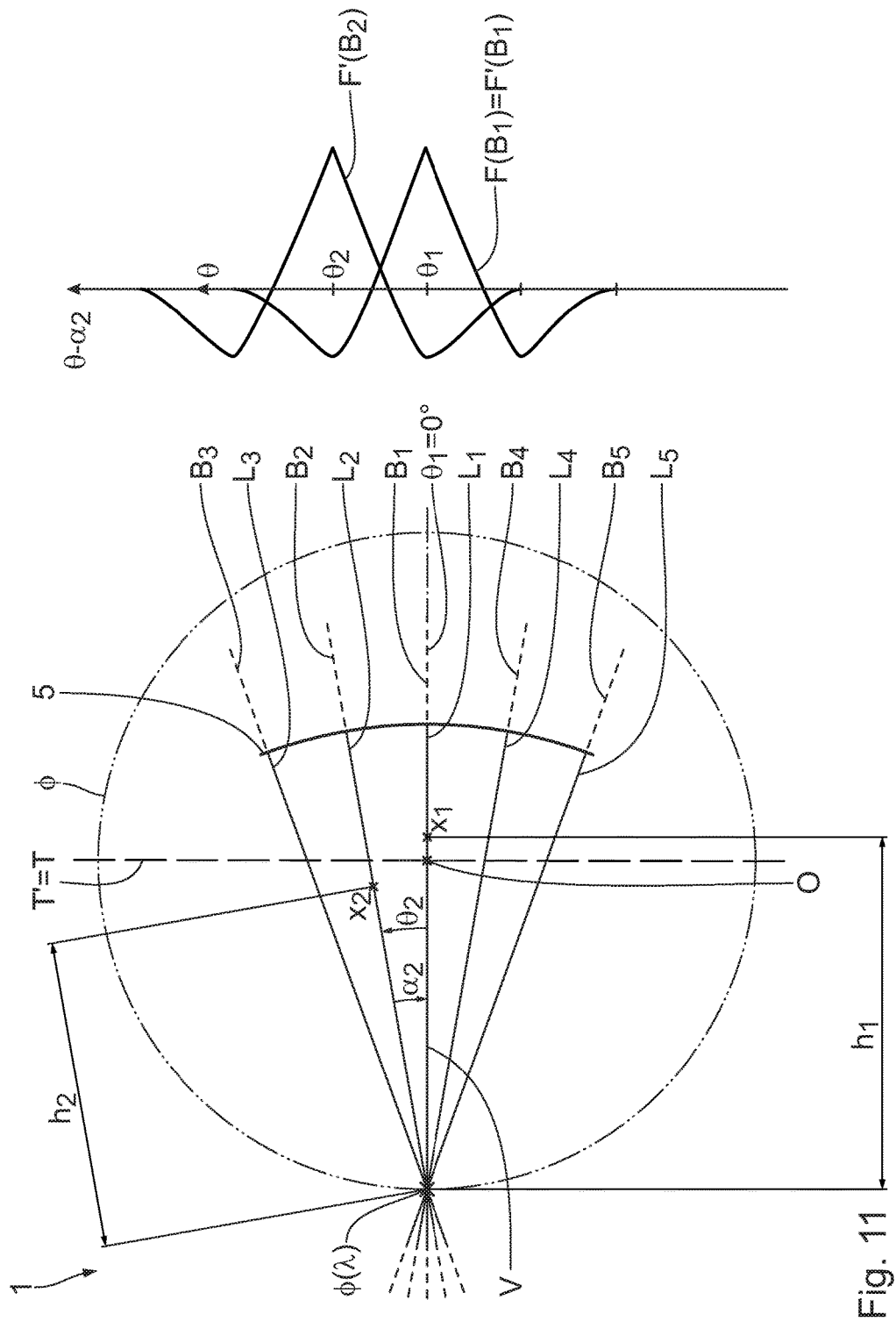

METHOD AND EVALUATION DEVICE FOR EVALUATING PROJECTION DATA OF AN OBJECT BEING EXAMINED

CROSS-REFERENCES TO RELATED APPLICATIONS

This application claims the priority of German patent application, Serial No. 10 2014 211 634.1, filed Jun. 17, 2014, pursuant to 35 U.S.C. 119(a)-(d), the content of which is incorporated herein by reference in its entirety as if fully set forth herein.

FIELD OF THE INVENTION

The invention concerns a method and an evaluation device for evaluating projection data of an object being examined, said data being determined in particular by means of x-ray computed tomography. In particular, the object being examined is a structural component in the technical testing of structural components and/or a patient in medical imaging.

BACKGROUND OF THE INVENTION

In x-ray computed tomography, the weakening intensity of the radiation along different projection beams through an object being examined is measured and used to deduce the density distribution in the object. Analytical reconstruction methods to reconstruct the object from the projection data are based on an inversion of the x-ray transform which the model of the x-ray computed tomography represents.

A reconstruction method described in the technical article "Mathematical framework of cone-beam reconstruction via the first derivative of the radon transform" by P. Grangeat in G. T. Herman, A. K. Louis and F. Natterer, Editors, Lecture Notes in Mathematics, Volume 1497, pp. 66 to 97, Springer 1991 postulates the existence of a special trajectory designated as the Tuy curve. The inversion formula underlying the reconstruction method is based on a relationship between the known 3-dimensional radon transform and the known 3-dimensional x-ray transform. In using this reconstruction method, a derivative has to be formed for a discontinuous function known as a Crofton function, which generally results in numerical instabilities in the reconstruction method, due to which the reliability and accuracy of the reconstruction method is unsatisfactory.

The technical article "A general scheme for constructing inversion algorithms for cone beam ct." by A. Katsevich, International Journal of Mathematics and Mathematical Sciences, 2003 (21): 1305 to 1321, 2003, discloses a reconstruction method based on the relationship between the known 3-dimensional radon transform and the known 3-dimensional x-ray transform described in the technical article by P. Grangeat, but which uses a weighting function to avoid the derivative of the Crofton function. While the reconstruction method is numerically more stable, the establishment of the weighting function is laborious, however.

SUMMARY OF THE INVENTION

The invention is based on an object of creating a method which is flexible to use and provides a precise and reliable evaluation of projection data of an object being examined.

This object is resolved by a method for the evaluation of projection data of an object being examined, determined in particular by means of x-ray computed tomography, comprising the steps:

provision of projection data of an object being examined which are determined along a trajectory in a multiplicity of projection positions relative to a co-ordinate origin, determination of a respective trajectory function for the projection positions, for each of a multiplicity of positions from a reconstruction region of dimension n by
  establishing an offset d, which corresponds to the value of a scalar product between the position and the projection position, and a direction vector at the co-ordinate origin,
  establishing a hyperplane of dimension n−1 which runs perpendicular to the direction vector and has the offset d to the co-ordinate origin,
  establishing a number of intersection points where the hyperplane intersects with the trajectory,
  establishing a derivative vector of the trajectory according to its trajectory path and calculating the derivative vector in the projection position,
  establishing an absolute value of a scalar product between the derivative vector and the position and dividing the absolute value by the number, and
transforming the trajectory functions into a frequency domain of dimension n relative to the positions,
evaluation of the projection data by means of the transformed trajectory functions with respect to at least one property of the object.

The method according to the invention determines a particular trajectory function and transforms it into a frequency domain for the projection positions, at which the projection data of the object being examined are determined along the trajectory. The projection data are then evaluated by means of the transformed trajectory functions with respect to at least one property of the object, such as the complete reconstruction of the object being examined using the projection data. In using the method according to the invention, a derivative of the projection data for a projection position and over several projection positions is unnecessary. In particular, the technique known in the prior art as the Crofton function does not have to be derived. Consequently, the method according to the invention is numerically stable and ensures that the evaluation of the projection data is simple, precise and reliable. Furthermore, the method according to the invention facilitates the evaluation of the projection data in a reconstruction region with any dimension n. In particular, dimension n can be: n=2, 3 or 4. This means that the method according to the invention can be used for layerwise 2-dimensional and for spatial 3-dimensional evaluation of the projection data, particularly if the object being examined changes in another time dimension. In the case of a 4-dimensional evaluation, projection data are determined at the particular projection position over time so that time in the method according to the invention represents an additional dimension of the trajectory or, respectively, of the reconstruction area. Hence, the method according to the invention is extremely flexible in performing the evaluation.

If the trajectory, along which the projection data are determined in the projection positions, represents a Tuy curve, then each of the determined hyperplanes will have at least one intersection with the trajectory, which is optimal for the evaluation. However, the method according to the invention also enables an evaluation of the projection data to be made with definable inaccuracies or artefacts if the trajectory does not form a Tuy curve, as is generally the case, for example, with a circular path as a trajectory and a 3-dimensional spatial evaluation of projection data. Hence, the method according to the invention is highly flexible and robust regarding the choice of the trajectory in the determination of the projection data.

The determination of the particular trajectory function t can be mathematically summarized as follows:

The transform $\phi: \Lambda \rightarrow R^n$ is the mathematical formulation of the trajectory which is located in the n-dimensional space of the real numbers $R^n$, wherein $\Lambda$ designates a 1-dimensional interval. In addition, $\Omega \subseteq R^n$ designates the n-dimensional reconstruction region. Below, the n-dimensional projection position $\phi(\lambda)$ is abbreviated as projection position $\lambda$, since the n-dimensional projection position $\phi(\lambda)$ is already designated clearly by the parameter $\lambda$.

A trajectory function t is defined and established for each projection position $\lambda$ by $$t(\lambda, y) := |\langle \phi'(\lambda), y\rangle| s(y, \langle \phi(\lambda), y\rangle)^{-1} = \frac{|\langle \phi'(\lambda), y\rangle|}{s(y, \langle \phi(\lambda), y\rangle)} \quad (1)$$

for a position y of the reconstruction region $\Omega$

In this, $\langle \phi'(\lambda), y\rangle$ and $\langle \phi(\lambda), y\rangle$ designate the scalar product between the derivative vector $\phi'(\lambda)$ and the position y, or between $\phi(\lambda)$ and the position y. The function $s(y, \langle \phi(\lambda), y\rangle)$ designates the number of intersection points S between the trajectory $\phi$ and those n−1 dimensional hyperplanes H which is perpendicular to the direction vector r and whose distance d from the co-ordinate origin O corresponds to the value of the scalar product $\langle \phi(\lambda), y\rangle$. The transform from the trajectory function t with respect to y to the frequency domain is designated by $T(\lambda, y)$.

A method, in which at least two areas which are imaged in associated projection data to at least two projection positions are not covered in the reconstruction region, guarantees high flexibility in the evaluation of the projection data. Where elongated objects, such as rotor blades in industry or patients in medicine, are being investigated, because of structural limitations in the test facility, there are regions, that is, parts of the object, which are mapped in different projection positions but are not covered in the reconstruction region. This case is known in x-ray computed tomography, for example, as the long object problem, since known reconstruction methods in projection data of these kinds are extremely laborious. The method according to the invention also guarantees the evaluation these types of projection data.

A method, in which the positions are arranged in a grid of dimension n, wherein the grid is arranged at least partially in the reconstruction region, and, in particular, comprises the reconstruction region completely, guarantees that a transform of the trajectory functions to the frequency range is simple and reliable.

A method, in which at least one position in the reconstruction region is established such that $d \neq 1$ holds for the associated offset d, guarantees that the evaluation of the projection data is simple, precise, reliable and flexible. Since not all positions in the reconstruction region lie on the unitary sphere, the calculation of the trajectory functions and their transform to the frequency range is guaranteed to be reliable. Known evaluation or reconstruction methods have the constraining condition that all positions in the reconstruction region must lie on the unitary sphere.

A method, in which the trajectory is a Tuy curve or the trajectory is not a Tuy curve and for each position whose associated hyperplane does not intersect with the trajectory, an estimated value, which does not equal zero, is established for the number of the intersection points, guarantees that the evaluation of the projection data is highly flexible. If the trajectory is in the shape of a Tuy curve, then each hyperplane intersects the trajectory at least once. The method according to the invention is highly accurate for Tuy curves. However, the method according to the invention also facilitates an evaluation of the projection data if the trajectory is not a Tuy curve. In this case, not every hyperplane has at least one intersection point with the trajectory. Since the absolute value is divided by the number of intersection points, this results in numerical instabilities. In order to avoid this in these types of trajectories, an estimated value is established for the number of intersection points which is not equal to zero, if a hyperplane has no intersection points with the trajectory. Preferably, the estimated value is established from the number of intersection points for adjacent hyperplanes which intersect the trajectory. Hence, the method according to the invention can also be used flexibly for trajectories which do not form a Tuy curve. Inaccuracies arising in the evaluation of projection data since the trajectory does not form a Tuy curve can be established so that the result of the evaluation can be assessed.

A method, in which the transforming into the frequency domain is carried out by means of a Fourier transform, guarantees that the transform of the trajectory functions to the frequency domain is simple and quick.

A method, in which the evaluation by means of the transformed trajectory functions comprises, at least a partial reconstruction of the object with the steps:
calculation of a convolution result for each projection position by
establishing a multiplicity of back-projection beams through the reconstruction region to the back-projection of the associated projection data,
back-projecting the projection data along the back-projection beams at a multiplicity of beam positions into the reconstruction region,
calculating a weighted back-projection such that the back-projected projection data at beam positions are provided with weightings, wherein the respective weighting is the reciprocal of an offset of the beam position to the projection position,
convolving the transformed trajectory function belonging to the respective projection position with the respective weighted back-projection into the respective convolution result,
summing the convolution results for the projection positions for at least a partial reconstruction of the object,
guarantees that the evaluation of the projection data is accurate. The measured projection data are projected back along the back projection beams into the reconstruction region. Then, the back-projected projection data are weighted and the associated transformed trajectory function is filtered by means of a convolution with the weighted back projection. The convolution results for the projection positions are summed for the evaluation of the projection data. Thus the object being examined is reconstructed, at least partly, by a filtering process according to a weighted back projection. Using the method according to the invention, in particular, the total object can be reconstructed precisely. Additionally, the reconstruction can be limited to desired areas of the object, such as its surface, or familiar object structures, by applying conventional and known linear operators, such as an edge detection operator, a structure operator, a wavelet-transform or a Hilbert transform, to the particular convolved result.

The reconstruction of the object f can be summarized mathematically as follows:

The n-dimensional unitary sphere is designated by $S^{n-1}$, meaning the amount of all n-dimensional vectors of length 1. The n-dimensional function f designates the object being reconstructed.

The projection value of a projection by the function f at the projection position λ for the beam direction θ is given as $$g(\lambda, \theta) := \int_3^\infty f(\phi(\lambda) + z\theta) dz, \qquad (2)$$

wherein θ is an element of the n-dimensional unitary sphere $S^{n-1}$ and z is an integration variable.

For each projection position λ, a convolution of the projection data g with the transformed trajectory function T is defined and determined by $$c(\lambda, y) = \int_{R^n} \frac{1}{|e|} g\left(\lambda, \frac{e}{|e|}\right) T(\lambda, y - e) de. \qquad (3)$$

c designates the convolved result. e is an integration variable. The term $$\frac{1}{|e|} g\left(\lambda, \frac{e}{|e|}\right)$$

in formula (3) here corresponds to a weighted back-projection. The reconstruction method with which the value corresponding to the density is established for the object f at the beam position b is based on the equation:

$$f(b) = \frac{1}{2\pi} \int_\lambda c(\lambda, \phi(\lambda) - b) + c(\lambda, b - \phi(\lambda)) d\lambda. \qquad (4)$$

Since the convolution c(λ, φ(λ)−b) assumes insignificantly small values, the calculation of f(b) at the integrands c(λ, b−φ(λ)) is reduced as follows:

$$f(b) \approx \frac{1}{2\pi} \int_\lambda c(\lambda, b - \phi(\lambda)) d\lambda. \qquad (5)$$

In this, the constant 1/(2π) is negligible. The reconstruction method according to the invention represents a discrete implementation of the analytical formula (5).

A method, in which the evaluation by means of the transformed trajectory functions comprises at least a partial reconstruction of the object with the steps:

calculation of a weighted back-projection for each projection position by
establishing a multiplicity of back-projection beams through the reconstruction region for the back-projection of the associated projection data,
establishing for each back-projection beam a rotational angle, in which the rotational angle starting from the back-projection beam to a connection beam between the projection position and the co-ordinate origin is produced,
calculating a rotated transformed trajectory function for at least one of the back-projection beams such that the transformed trajectory function is rotated about the associated rotational angle relative to the co-ordinate origin,
establishing for each back-projection beam a multiplicity of forward projection beams with associated directional angles,
calculating a filter function for the at least one back-projection beam and in relation to the directional angle such that, along the associated forward projection beams, the rotated transformed trajectory function at a multiplicity of beam positions is provided with weightings and summed, wherein the respective weighting is an offset, raised to the power 2, of the beam position to the projection position,
calculating a rotated filter function for each back-projection beam such that the directional angles of the filter function are rotated about the negative rotational angle,
calculating a back projection value for each back-projection beam such that a product of the rotated filter function and the associated projection data is formed and the product is summed,
calculating a back-projection such that the back projection values (m) along the associated back-projection beams are back-projected into the reconstruction region,
calculating a weighted back-projection such that the back-projection at evaluation positions in the reconstruction region is provided with weightings, wherein the respective weighting is a quotient, raised to the power 2, of a first offset and a second offset, wherein the first offset is defined by the projection position and the co-ordinate origin and the second offset by the projection position and the respective evaluation position,
summing the weighted back projections for the projection positions for at least a partial reconstruction of the object, guarantees that the evaluation of the projection data is simple and accordingly quick. In the method, for at least one back-projection beam, a filter function is calculated by means of the associated transformed trajectory function, wherein the back-projection is calculated using the rotated filter function. In this back-projection with filtering, the filtering can be fully translation invariant, partially translation invariant or translation variant depending on the number of the at least one calculated filter function. If a filter function is calculated with exactly one back-projection beam, then this filter function is used as the basis for all back-projection beams and the associated back-projection. In the calculation of exactly one filter function, the filtering is hence fully translation invariant since the exactly one filter function is used for the calculation of the back-projection along all back-projection beams. If particular filter functions are calculated for a multiplicity of back-projection beams, then, with these filter functions, the filtering is partially translation invariant. The particular filter function serves as a basis for calculating the back-projection along the back-projection beam for which the filter function was calculated, as well as for calculating the back-projection along other adjacent back-projection beams. If, on the other hand, a particular filter function is calculated for all back-projection beams, then the filtering is translation variant since a calculated filter function is not used also for the calculation of the back-projection along an adjacent back-projection beam. As the number of filter functions being calculated increases, the accuracy as well as the effort increase in the evaluation of the projection data. Thus, the evaluation of the projection data with the back-projection with translation invariant filtering requires the least effort and the evaluation with the back-projection with translation variant filtering is the most precise. Hence, both the effort and the precision in the reconstruction can be adjusted to a desired amount by means of the number of filter functions requiring calculation. In these cases, the inaccuracies and artefacts can be established. Using the method according to the invention, the object being examined can be fully reconstructed. In the case of a partial reconstruction of the object, for instance in the reconstruction of the surface, or of familiar object structures, conventional and known linear operators, such as an edge detection operator, a structure operator, a wavelet-transform or a Hilbert transform can be used on the particular rotated transformed trajectory function.

The reconstruction method be summarized mathematically as follows:

The n-dimensional unitary sphere is designated by $S^{n-1}$, meaning the amount of all n-dimensional vectors of length 1. The n-dimensional function f designates the object being reconstructed.

The projection value of a projection by the function f at the projection position λ for the beam direction θ is given as $$g(\lambda,\theta):=\int_0^\infty f(\phi(\lambda)+z\theta)dz, \quad (6)$$

wherein θ is an element of the n-dimensional unitary sphere $S^{n-1}$ and z is an integration variable.

For an evaluation position k from the n-dimensional reconstruction region Ω and a projection position λ, $U_{k,\lambda}$ designates that n-dimensional rotation with which the straight line between the evaluation position k and the projection position λ to the straight line between the co-ordinate origin O and the projection position λ can be rotated, wherein the fulcrum is located in the projection position λ. This n-dimensional rotation can be identified uniquely by n−1 angles α(1) to α(n−1). Correspondingly, $U_{k,\lambda}^{-1}$ designates the n-dimensional rotation in the opposite direction.

For each evaluation position k from the n-dimensional reconstruction region Ω and each projection position λ, a rotated transformed trajectory function T' is defined and determined by $$T'(k,\lambda,y):=U_{k,\lambda}T(\lambda,y) \quad (7)$$

wherein the rotation $U_{k,\lambda}$ is applied at the position y as a variable of T.

Using a weighted forward projection, at each evaluation point k from the n-dimensional reconstruction region Ω and each projection position λ, a filter function F depending on a direction θ from $S^{n-1}$ is established by $$F(k,\lambda,\theta):=\int_{-\infty}^\infty |x|^{n-2}T'(k,\lambda,\phi(\lambda)+x\theta)dx, \quad (8)$$

wherein x is an integration variable.

Since values of the rotated transformed trajectory function T' become negligibly small outside the reconstruction area Ω, in calculating the filter function F, the integration can be reduced along half lines instead of lines. The following approximation applies:

$$F(k,\lambda,\theta)\approx\int_0^\infty |x|^{n-2}T'(k,\lambda,\phi(\lambda)|x\theta)dx \quad (9)$$

In addition, a rotated filter function $$F'(k,\lambda,\theta):=U_{k,\lambda}^{-1}F(k,\lambda,\theta) \quad (10)$$

is defined and determined, wherein the rotation $U_{k,\lambda}^{-1}$ at the directional angle θ is used as a variable of F.

The reconstruction method, with which the value corresponding to the density can be determined at the evaluation position k for the object f, is based on the following equation:

$$f(k) = \frac{1}{2\pi}\int_\lambda \left(\frac{|\phi(\lambda)|}{|\phi(\lambda)\cdot k|}\right)^2 \int_{S^n} g(\lambda,\theta)F'(k,\lambda,\theta)d\theta d\lambda. \quad (11)$$

The constant 1/(2π) in this case is negligible. The term $\int_{S^n}g(\lambda,\theta)F'(k,\lambda,\theta)d\theta$ in formula (11) corresponds here to a filtered back-projection. The reconstruction method according to the invention constitutes a discrete implementation of the analytical formula (11).

A method, in which the rotated transformed trajectory function and the filter function are calculated for at least three, in particular for at least five, and, in particular, for each back-projection beam, guarantees that the evaluation of the projection data is highly flexible. As the number of back-projection beams increases, for which the rotated transformed trajectory function and the filter function are calculated, the accuracy increases. Preferably the rotated transformed trajectory function and the filter function are always calculated independently of the number of back-projection beams for the back-projection beam with the rotational angle zero since the calculation for this back-projection beam is extremely simple.

A method, in which the rotated filter function is calculated for back-projection beams, whose rotational angles include an angular range of 3° to 15°, in particular of 4° to 10°, wherein the angular range is arranged, in particular, symmetrically to the connection beam, guarantees that the evaluation of the projection data is highly flexible. By using the back-projection with partially translation invariant filtering, depending on the angular range, any desired amount of simplicity, speed and accuracy can be achieved in performing the evaluation. One of the angular ranges is arranged particularly symmetrical to the connecting beam since, by so doing, the filter function calculated for this angular range for the back-projection beam with the zero rotational angle can be used. This simplifies the evaluation.

Furthermore, the invention is based on an object of producing an evaluation device enabling an evaluation of projection data of an object being examined to be performed which is simple, precise, reliable and flexible.

This object is resolved by an evaluation device for the evaluation of projection data of an object being examined, determined in particular by means of x-ray computed tomography, which is designed such that projection data of an object being examined are provided which are determined along a trajectory in a multiplicity of projection positions relative to a co-ordinate origin, a respective trajectory function is determined for the projection positions for each of a multiplicity of positions from a reconstruction region of dimension n by establishing an offset d, which corresponds to the value of a scalar product between the position and the projection position, and a direction vector at the co-ordinate origin, establishing a hyperplane of dimension n−1 which runs perpendicular to the direction vector and has the offset d to the co-ordinate origin, establishing a number of intersection points where the hyperplane intersects with the trajectory, establishing a derivative vector of the trajectory according to its trajectory path and calculating the derivative vector in the projection position, establishing an absolute value of a scalar product between the derivative vector and the position and dividing the absolute value by the number, and the trajectory functions in a frequency domain of dimension n are transformed relative to the positions, the projection data are evaluated by means of the transformed trajectory functions with respect to at least one property of the object.

The advantages of the evaluation device according to the invention correspond to the advantages of the method according to the invention already described. In particular, the evaluation device is designed such that it can be developed further, still including the features according to the invention.

A test facility for the determination and evaluation of projection data of an object being examined, in particular x-ray computer tomograph, with a projection source for the radiation of an object being examined from a multiplicity of projection positions lying on a trajectory a detector to determine projection data of the object, and an evaluation device according to the invention, guarantees that an evaluation of the projection data is simple and quick. In particular, the determined projection data can be evaluated at the same time parallel to the determination of other projection data. In particular, the test facility is designed as an x-ray computerized tomograph for the testing of objects. Moreover, the method according to the invention can be used in equipment for positron emission tomography, seismic tomography, layer imaging with ultrasound or radio astronomy. Furthermore, the method according to the invention can always be used when projection data of an object is available which can be modelled by an x-ray transform, and a property of the object has to be calculated.

Further features, advantages and details of the invention emerge from the following description of several embodiment examples.

DESCRIPTION OF THE PREFERRED EMBODIMENTS

Figure 1:
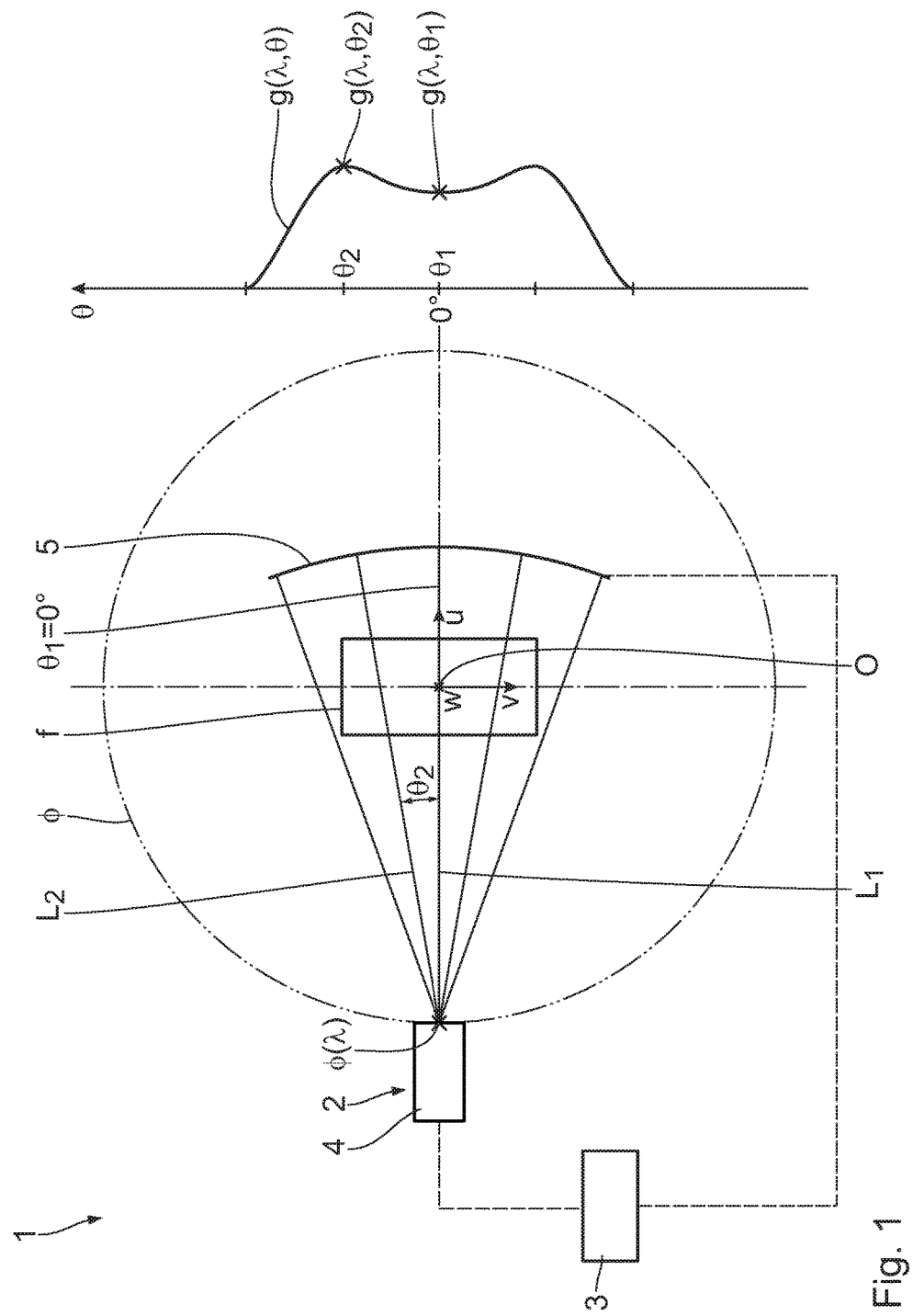
FIG. 1 a diagrammatic depiction of a test facility for the determination and evaluation of projection data of an object being examined, FIG. 2 a diagrammatic sequence for the determination of trajectory functions transformed to a frequency domain for the evaluation of the determined projection data, FIG. 3 a diagrammatic depiction for the determination of the trajectory functions, FIG. 4 a diagrammatic sequence to illustrate an evaluation method according to a first embodiment example for the evaluation of the projection data, FIG. 5 a depiction of a trajectory function t along a v direction, FIG. 6 a depiction of a trajectory function T transformed to the frequency domain for the trajectory function t in FIG. 5, FIG. 7 a diagrammatic depiction to illustrate the evaluation method according to FIG. 4, FIG. 8 a diagrammatic sequence to illustrate an evaluation method according to a second embodiment example, FIG. 9 a diagrammatic depiction to illustrate the calculation of a particular rotated filter function for back-projection beams, FIG. 10 a diagrammatic depiction to illustrate the calculation of a weighted back-projection, and FIG. 11 a diagrammatic depiction to illustrate the calculation of rotated filter functions based on a filter function in an evaluation method according to a third embodiment example.

A test facility 1 has a projection source/detector unit 2 and an evaluation device 3 for the determination and evaluation of projection data g of an object f being examined. The evaluation device 3 is connected by signal to a projection source 4 and a detector 5 of the projection source/detector unit 2. The test facility 1 is designed, for example, as an x-ray computerized tomograph for testing the object f by means of x-ray radiation.

The projection source/detector unit 2 can be designed in any way but mainly in relation to the object being examined f. The projection source 2, for example, can emit a cone beam for the 3-dimensional testing of the object f and the associated detector 5 can be designed as a surface detector. Furthermore, the projection source 4 can emit a fan-shaped beam for the 2-dimensional testing of the object f and the associated detector 5 can be designed as a line detector. FIG. 1 illustrates a fan-shaped beam, or fan-shaped part of a cone beam, and an associated line detector, or a line of an associated surface detector.

The test facility 1 defines a Cartesian co-ordinate system with u, v and w directions running perpendicular to each other and a co-ordinate origin O. FIG. 1 shows the u/v plane. The projection source/detector unit 2 and the object f can be displaced relative to each other along a trajectory φ. For this, the projection source/detector unit 2 and/or the object f can be rotated about a rotational axis running through the co-ordinate origin O in the w direction and can be displaced linearly, in particular, along the rotational axis also.

The test facility 1 works as follows:

The object f being examined is arranged essentially with its center at the co-ordinate origin O between the projection source 4 and the detector 5. Then the projection source/detector unit 2 is displaced relative to the object f along a trajectory φ. In FIG. 1, the trajectory φ is a circular path around the co-ordinate origin O. At a multiplicity of projection positions λ, the object f is radiated by means of the projection source 4 and associated projection data g of the object f is determined by means of the detector 5. Each pixel of the detector 5 corresponds here to a forward projection beam L which is at a directional angle θ between the projection position λ and the co-ordinate origin O relative to a connecting beam. As shown in FIG. 1, the projection data g depends, therefore, on the projection position λ and the directional angle θ. The directional angle θ is illustrated in FIG. 1 in the u/v plane. In the case of a surface detector, the directional angle θ has correspondingly a multiplicity of components.

Figure 2:
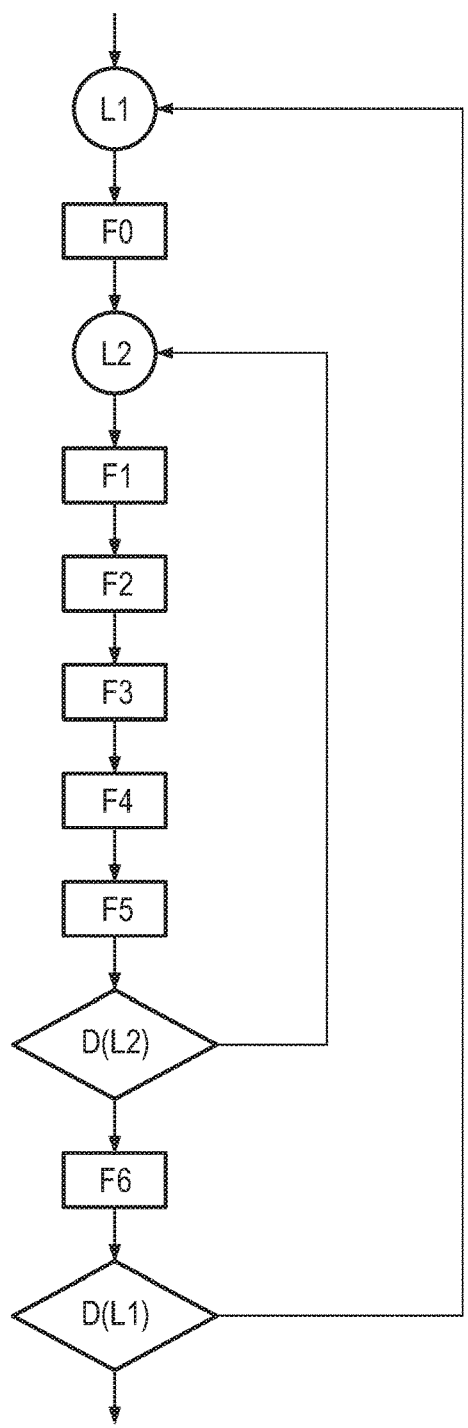

The evaluation device 3 evaluates the projection data g. The evaluation of the projection data g is performed, according to the invention, by means of trajectory functions t. In doing so, a particular associated trajectory function t is determined for each projection position λ. The determination of the trajectory functions t is illustrated in the diagrammatic sequence in FIG. 2.

Figure 3:
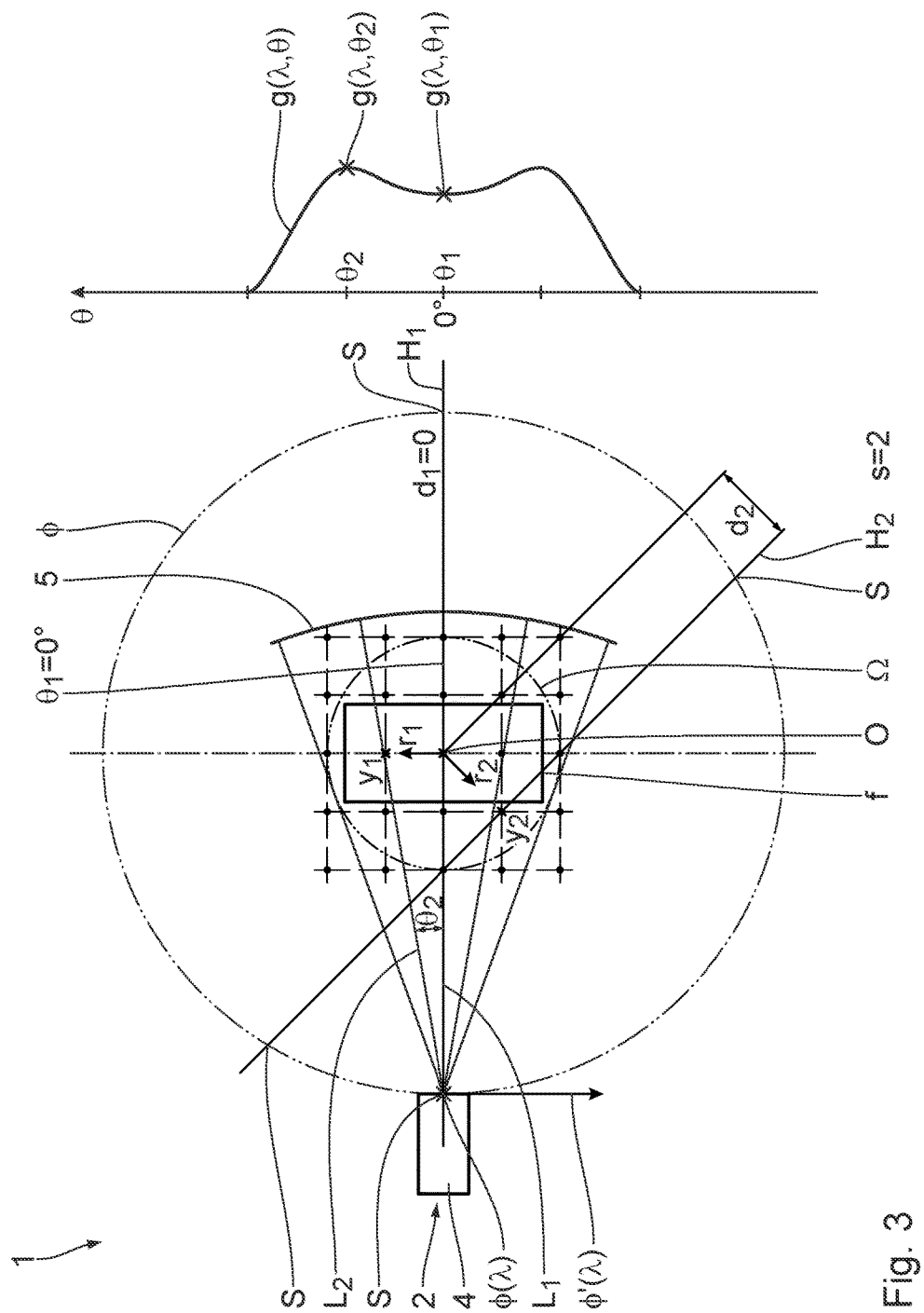
Figure 4:
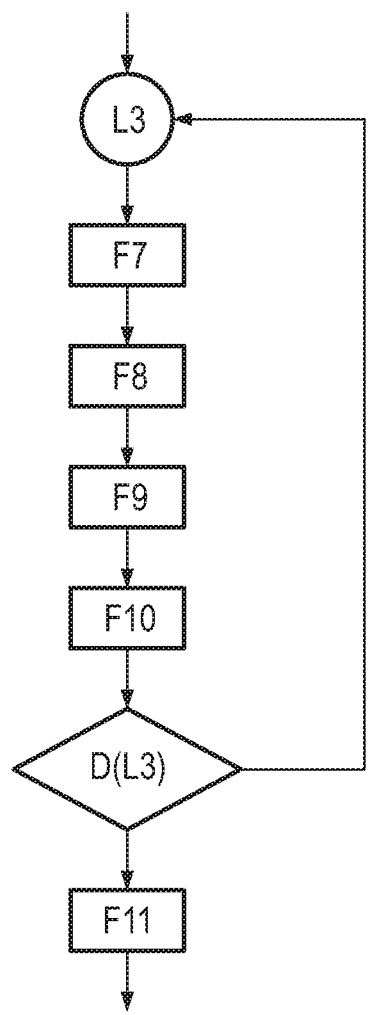

In step L1, a projection position λ is selected from the projection positions λ. Next, in step F0, a number of positions y are established which are arranged in a grid in a desired reconstruction region Ω of dimension n. Preferably, the grid completely encompasses the reconstruction region Ω. In step L2, a position y is selected from the established positions y. An offset d as well as a direction vector r, as that vector connecting co-ordinate origin O with the position y, is established for this position y in step F1. The determination of the offset d results from the calculation of the scalar product between the position y and the projection position λ. The associated offsets $d_1$ and $d_2$ as well as the associated direction vectors $r_1$ and $r_2$ are illustrated in FIG. 3 by way of example for two positions $y_1$ and $y_2$. In step F2, a hyperplane H of dimension n−1 is established, running perpendicular to the direction vector r and is offset by d from the co-ordinate origin O. If dimension n=2, the hyperplane H is a straight line. Hyperplanes $H_1$ and $H_2$ are illustrated in FIG. 3 by way of example. Next, in step F3, the number of points S where the hyperplane H intersects with the trajectory φ is established. In FIG. 3, the hyperplanes $H_1$ and $H_2$ each have two intersection points S, so that s=2 applies. In a following step F4, a derivative vector φ' of the trajectory φ is established in accordance with its trajectory path and is calculated in the projection position λ. This corresponds to the determination of the tangential vector on the trajectory φ in the projection position λ. Then the trajectory function t is determined for the position y in which an absolute value of a scalar product is established between the derivative vector φ' and the position y and it is divided by the quantity s. Then a check is performed in a loop D(L2) to see whether all positions y in the grid set up in step F0 have been processed. If they have not, the process jumps back to step L2 and the next position y is selected until all positions y have been processed.

If the trajectory function t has been established for all positions y, then this is transformed in step F6 into a frequency domain of dimension n relative to the positions y. Then a check is performed in a loop D(L1) to see whether all projection positions λ have been processed. If they have not, the process jumps back to step L1 and the next projection position λ is selected. Again, in step F0, a number of positions y are established. Then, the trajectory function t is determined for the next projection position λ in the manner described and transformed to the frequency domain.

Figure 5:
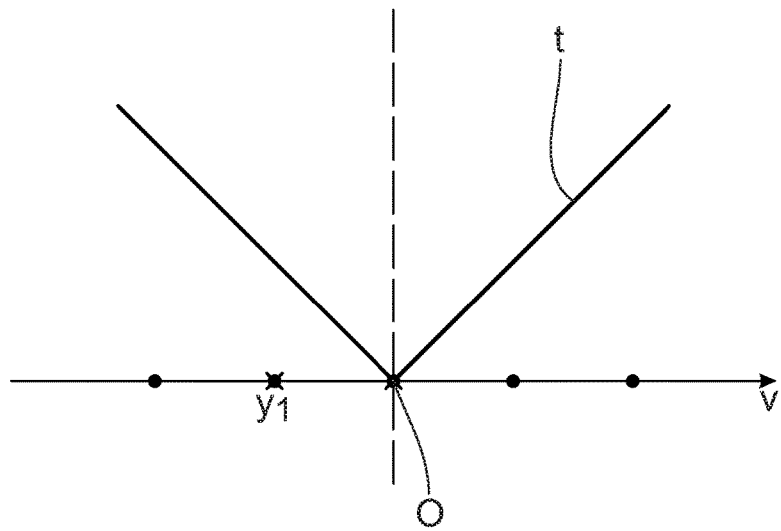
Figure 6:
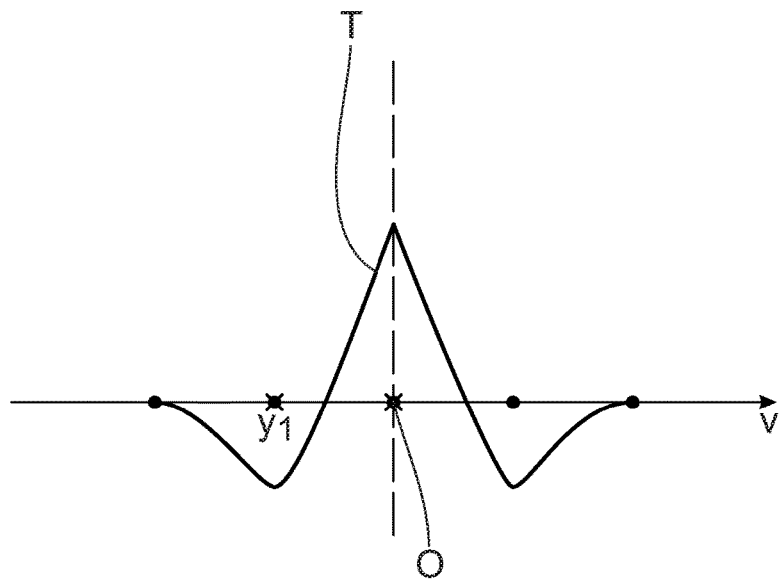

Thus, using the described method, a transformed trajectory function T is determined for each projection position λ. The transforming of the trajectory functions t to the frequency domain is performed, for example, by means of a Fourier transform. In FIG. 5 one of the trajectory functions t is shown along the v direction through the co-ordinate origin O. In the reconstruction region Ω along the u direction the illustrated function t is constant. In FIG. 6 the transformed trajectory function T associated with the trajectory function t is illustrated along the v direction through the co-ordinate origin O of the frequency domain. The illustrated function T is zero outside the v direction.

Since the positions y are distributed in the reconstruction region Ω and are arranged in the form of a grid, in particular, generally d≠1 holds for the particular offset d. This means that the offset d of the positions y generally does not lie on the unitary sphere. However, individual positions y may happen to lie on the unitary sphere.

If the trajectory φ is shaped as a Tuy curve, then each hyperplane H has an intersection S with the trajectory φ. The method according to the invention can also be performed in conjunction with a trajectory φ which is not in the form of a Tuy curve. If the trajectory φ is not a Tuy curve, then at least one of the hyperplanes H has no intersection S with the trajectory φ, so that, for this hyperplane H, s=0 would hold. In order to avoid dividing by zero in step F5, an estimated value s≠0 for the number s of the intersections S is established in step F3 for hyperplanes H without an intersection S. The estimated value is established preferably in relation to the number s at adjacent positions y.

Figure 7:
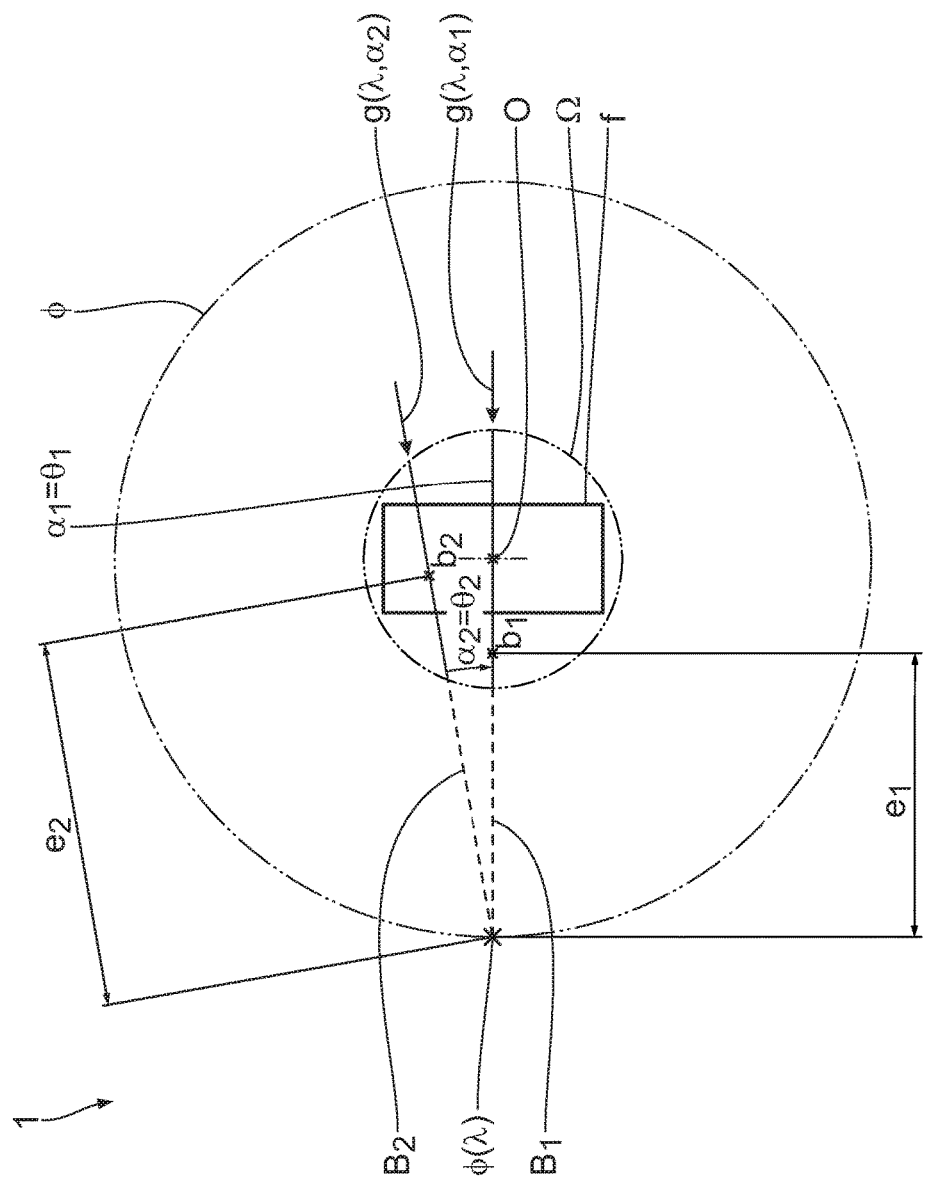

Using the transformed trajectory functions T, the projection data g are evaluated with respect to at least one property of the object f. A first embodiment example for an evaluation method is described below with the aid of FIGS. 4 to 7. In step L3, a projection position λ is selected from the projection positions λ. At this projection position λ, a multiplicity of back-projection beams B through the reconstruction region Ω to the back-projection of the associated projection data g are established in step F7. Back-projection beams $B_1$ and $B_2$ are shown in FIG. 7 by way of example. In step F8, a back-projection is calculated such that the projection data g are back-projected along the back-projection beams B at a multiplicity of beam positions b into the reconstruction region Ω. The back-projection beams B are established preferably to correspond to the forward projection beams L. In this case, a rotational angle α of the particular back-projection beams B corresponds to the directional angle θ of the corresponding forward projection beam L. In step F9, a weighted back-projection is calculated such that the back-projected projection data g are provided with weightings at the beam positions b, wherein the particular weighting is the reciprocal of an offset e of the beam position b to the projection position λ. This is shown in FIG. 7 as an example by means of two beam positions $b_1$ and $b_2$. In step F10, the transformed trajectory function T belonging to the projection position λ is convolved with the weighted back-projection to a convolution result. Then a check is performed in a loop D(L3) to see whether all projection positions λ have been processed. If they have not, the process jumps back to step L3 and the next projection position λ is selected. This is repeated until all projection positions λ have been processed. Once all projection positions λ have been processed, in step F11 the convolution results are summed for all projection positions λ. The summed convolution results produce a reconstruction of the object f.

Figure 8:
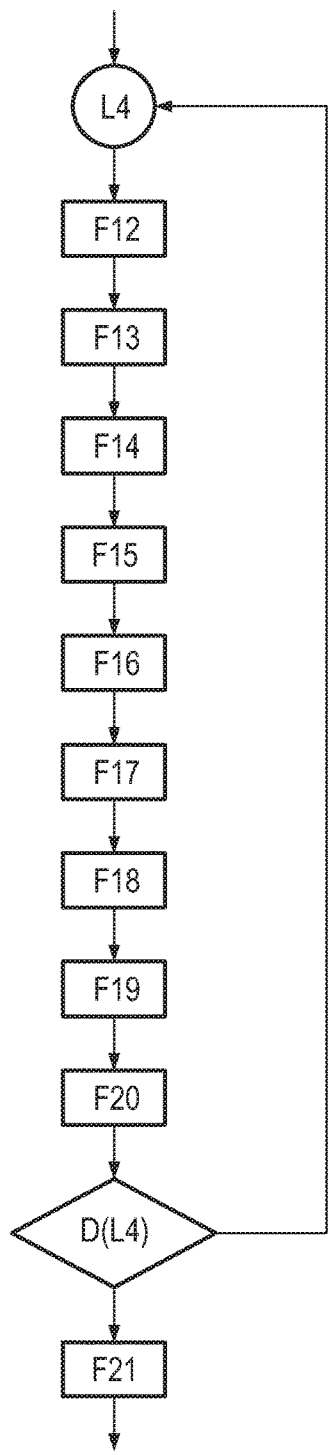
Figure 9:
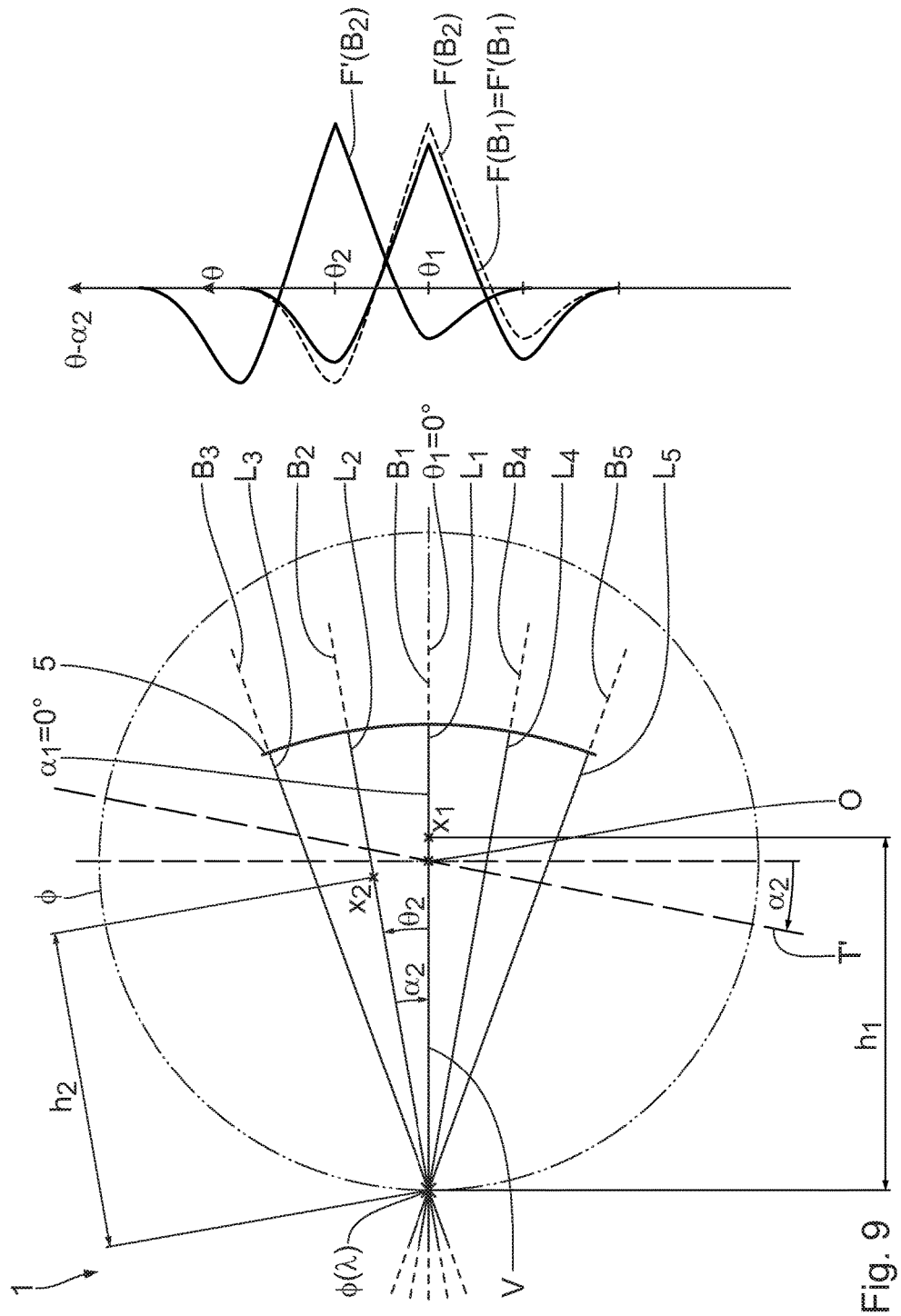
Figure 10:
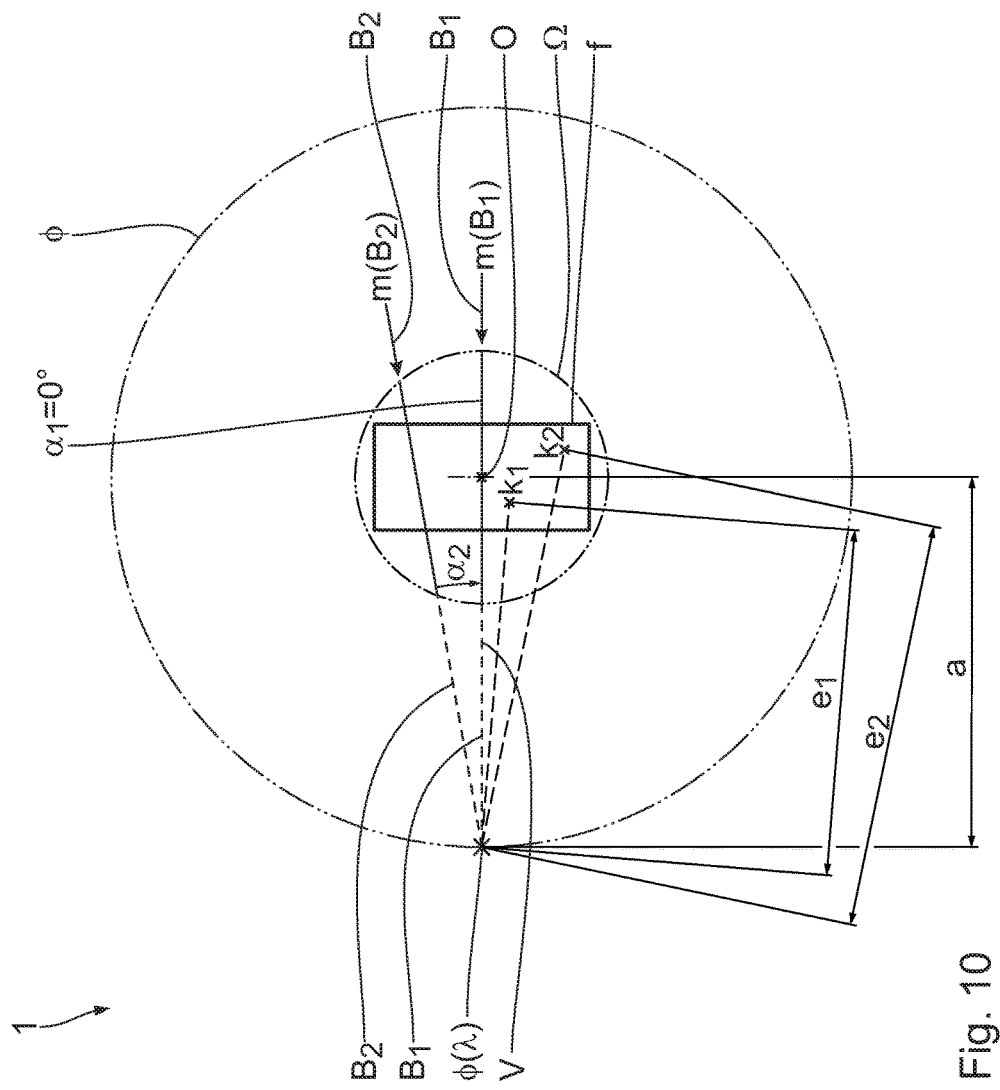

A second embodiment example for an evaluation method is described below with the aid of FIGS. 8 to 10 to evaluate the projection data g using the transformed trajectory functions T. In step L4, a projection position λ is selected from all projection positions λ. Next, in step F12, a multiplicity of back-projection beams B through the reconstruction region Ω to the back-projection of the associated projection data g are established. In a following step F13, a rotational angle α is established for each back-projection beam B, wherein the rotational angle α between the particular back-projection beam B and a connection beam V between the projection position λ and the co-ordinate origin O is created. In step F14, for each back-projection beam B, a rotated transformed trajectory function T' is calculated such that the transformed trajectory function T is rotated about the associated rotational angle α relative to the co-ordinate origin O. In a following step F15, for each back-projection beam B a multiplicity of forward projection beams L are established with associated directional angles θ relative to the connection beam V. In FIG. 9, two back-projection beams $B_1$ and $B_2$ as well as associated forward projection beams $L_1$ to $L_5$ are shown by way of example. Then, in step F16, for each of the back-projection beams B and in relation to the directional angle θ, a particular filter function F(B) is calculated such that the rotated transformed trajectory function T' is provided with weightings at a multiplicity of beam positions x and summed along the associated forward projection beams L, wherein the particular weighting is an offset h, raised to the power n−2, of the beam position x at the projection position λ. This is illustrated in FIG. 9 by way of example for the back-projection beams $B_1$ and $B_2$ and beam positions $x_1$ and $x_2$ at the forward projection beams $L_1$ and $L_2$. Following this, in step F17, a rotated filter function F'(B) is calculated for each back-projection beam B such that the directional angles θ of the filter function F(B) are rotated about the negative rotational angle α of the associated back-projection beam B. Since the back-projection beam $B_1$ is at the rotational angle $α_1=0°$ in FIG. 9, the rotated filter function $F'(B_1)$ of the filter function $F(B_1)$ corresponds to this back-projection beam $B_1$. In a following step F18, a back projection value m is calculated for each back-projection beam B such that a product of the rotated filter function F'(B) and the associated projection data g is formed and the product is summed, element by element. Then, in step F19, a back-projection is calculated such that the back projection values m along the associated back-projection beams B are back-projected into the reconstruction region Ω. This is illustrated in FIG. 10. In a further step F20, a weighted back-projection is calculated such that the back-projection is provided with weightings at evaluation positions k in the reconstruction region Ω, wherein the particular weighting is a quotient raised to the power 2 of a first offset a and a second offset e, wherein the first offset a is defined by the projection position λ and the co-ordinate origin O and the second offset e is defined by the projection position λ and the particular evaluation position k. This is illustrated in FIG. 10 for two evaluations positions $k_1$ and $k_2$ by way of example. A check is performed in a loop D(L4) to see whether all projection positions λ have been processed. If they have not, the process jumps back to step L4 and the next projection position λ is selected. The described method is repeated until all projection positions λ have been processed. Once all projection positions λ have been processed, in step F21 the calculated weighted back projections are summed for all projection positions λ for a reconstruction of the object f.

An evaluation method according to a third embodiment example is described below with the aid of FIG. 11. In contrast to the second embodiment example, the rotated transformed trajectory function T' and the filter function F are calculated for a back-projection beam B only, for example, for the back-projection beam $B_1$. The rotated filter function $F'(B_1)$ of the filter function $F(B_1)$ corresponds to the back-projection beam $B_1$. The filter function $F(B_1)$ forms the basis for the calculation of the rotated filter functions F'(B) for all back-projection beams B. The filter function $F(B_1)$ is rotated about the negative rotational angle α of the particular back-projection beam B for calculating the rotated filter functions F'(B). As shown in FIG. 11 with the aid of the back-projection beams $B_1$ and $B_2$, the rotated filter function $F'(B_2)$ is simply displaced about the rotational angle $α_2$ along the directional angle θ for the rotated filter function F'(B). The rotated filter functions F'(B) are thus translation invariant and so do not change in relation to the back-projection beams B. You are referred to the second embodiment example regarding the other steps in the method of reconstructing the object f.

In principle, using the third embodiment example, an associated rotated transformed trajectory function T' and a filter function F can be calculated for any number of back-projection beams B, particularly as least three and particularly at least five back-projection beams B. As the number of back-projection beams B increases for which the rotated transformed trajectory function T' and the associated filter function F are calculated, the accuracy of the reconstruction as well as the computational effort increase. With regard to the second embodiment example, the accuracy is the highest, whereas, with the third embodiment example, the computational effort is the lowest. Preferably, where there is a multiplicity of back-projection beams B for which a rotated transformed trajectory function T' and a filter function F are calculated, the rotated filter functions F' are determined section by section for back-projection beams B whose rotational angles α enclose an angular range of 30 to 150, in particular from 40 to 100. Preferably, one of the angular ranges is arranged symmetrically to the connection beam V, so that the simple calculation of the filter function F for the rotational angle α=0 can be used in calculating the rotated filter functions F'. In the particular angular range, the associated filter function F is simply displaced and is translation invariant in this section, therefore.

The method according to the invention as well as the evaluation device according to the invention are particularly suited for the examination of long, extended objects f. The usual problem with these types of object f is that at least two areas which are imaged in the associated projection data g to at least two projection positions λ cannot be covered in the reconstruction region Ω. This is known as the long object problem. The method according to the invention also produces good evaluation results in the evaluation of these types of projection data g.

The method according to the invention can be used mainly on reconstruction areas Ω with any dimension n. In addition, in the case of three spatial dimensions, a time dimension can also be evaluated as a fourth dimension if the object being examined f changes over time. In this case, a multiplicity of temporally shifted projection data g are determined at the projection positions λ, by means of which projection data g for the fourth dimension are produced.

To perform the method according to the invention, a computer program product, for example, can be provided which comprises program sections which are uploaded on to a computer to perform the method according to the invention.

The invention claimed is:

1. A method for evaluation of projection data of an object being examined, the method comprising the steps:
providing projection data of an object being examined which are determined along a trajectory in a multiplicity of projection positions relative to a co-ordinate origin;
determining a respective trajectory function for the projection positions, for each of a multiplicity of positions from a reconstruction region of dimension n by:
establishing an offset, which corresponds to a value of a scalar product between one of the positions and one of the projection positions, and a direction vector at the co-ordinate origin;
establishing a hyperplane of dimension n−1 which extends perpendicular to the direction vector and the hyperplane has the offset to the co-ordinate origin;
establishing a number of intersection points where the hyperplane intersects with the trajectory;
establishing a derivative vector of the trajectory according to its trajectory path and calculating the derivative vector in the projection position;
establishing an absolute value of a scalar product between the derivative vector and the position and dividing the absolute value by the number of intersection points;
transforming the trajectory functions into a frequency domain of dimension n relative to the positions;
evaluating the projection data by means of the transformed trajectory functions with respect to at least one property of the object.

2. The method according to claim 1, wherein at least two areas which are imaged in associated projection data to at least two projection positions are not covered in the reconstruction region.

3. The method according to claim 1, wherein the positions are arranged in a grid of dimension n, wherein the grid is arranged at least partially in the reconstruction region.

4. The method according to claim 1, wherein at least one position in the reconstruction region is established such that the offset does not equal one holds for the associated offset.

5. The method according to claim 1, wherein the trajectory is a Tuy curve or the trajectory is not a Tuy curve and for each position whose associated hyperplane does not intersect with the trajectory, an estimated value, which does not equal zero, is established for the number of the intersection points.

6. The method according to claim 1, wherein the transforming into the frequency domain is carried out by means of a Fourier transform.

7. The method according to claim 1, wherein the evaluating of the projection data by means of the transformed trajectory functions comprises, at least a partial reconstruction of the object with the steps of:
   calculating a convolution result for each projection position by:
      establishing a multiplicity of back-projection beams through the reconstruction region to the back-projection of the associated projection data;
      back-projecting the projection data along the back-projection beams at a multiplicity of beam positions into the reconstruction region;
      calculating a weighted back-projection such that the back-projected projection data at beam positions are provided with weightings, wherein the respective weighting is a reciprocal of an offset of a beam position to the projection position;
   convolving the transformed trajectory function belonging to the respective projection position with the respective weighted back-projection into the respective convolution result;
   summing the convolution results for the projection positions for at least a partial reconstruction of the object.

8. The method according to claim 1, wherein the evaluating of the projection data by means of the transformed trajectory functions comprises at least a partial reconstruction of the object with the steps of:
   calculating a weighted back-projection for each projection position by:
      establishing a multiplicity of back-projection beams through the reconstruction region for the back-projection of the associated projection data;
      establishing for each back-projection beam a rotational angle, in which the rotational angle starting from the back-projection beam to a connection beam between the projection position and the co-ordinate origin is produced;
      calculating a rotated transformed trajectory function for at least one of the back-projection beams such that the transformed trajectory function is rotated about an associated rotational angle relative to the co-ordinate origin;
      establishing for each back-projection beam a multiplicity of forward projection beams with associated directional angles;
      calculating a filter function for the at least one back-projection beam and in relation to the directional angle such that, along associated forward projection beams, the rotated transformed trajectory function at a multiplicity of beam positions is provided with weightings and summed, wherein the respective weighting is an offset, raised to the power two, of the beam position to the projection position;
      calculating a rotated filter function for each back-projection beam such that the directional angles of the filter function are rotated about a negative rotational angle;
      calculating a back projection value for each back-projection beam such that a product of the rotated filter function and associated projection data is formed and the product is summed;
      calculating a back-projection such that the back projection values along the associated back-projection beams are back-projected into the reconstruction region;
      calculating a weighted back-projection such that the back-projection at evaluation positions in the reconstruction region is provided with weightings, wherein the respective weighting is a quotient, raised to the power two, of a first offset and a second offset, wherein the first offset is defined by the projection position and the co-ordinate origin and the second offset by the projection position and a respective evaluation position;
   summing the weighted back projections for the projection positions for at least a partial reconstruction of the object.

9. The method according to claim 8, wherein the rotated transformed trajectory function and the filter function are calculated for at least three back-projection beams.

10. The method according to claim 8, wherein the rotated filter function is calculated for back-projection beams, whose rotational angles include an angular range of 3° to 15°.

11. An evaluation device for evaluation of projection data of an object being examined, the evaluation device being configured such that
   projection data of an object being examined are provided which are determined along a trajectory in a multiplicity of projection positions relative to a co-ordinate origin;
   a respective trajectory function is determined for the projection positions for each of a multiplicity of positions from a reconstruction region of dimension n by:
      establishing an offset, which corresponds to a value of a scalar product between one of the positions and one of the projection positions, and a direction vector at the co-ordinate origin;
      establishing a hyperplane of dimension n−1 which extends perpendicular to the direction vector and has the offset to the co-ordinate origin;
      establishing a number of intersection points where the hyperplane intersects with the trajectory;
      establishing a derivative vector of the trajectory according to its trajectory path and calculating the derivative vector in the projection position;
      establishing an absolute value of a scalar product between the derivative vector and the position and dividing the absolute value by the number;
   the trajectory functions in a frequency domain of dimension n are transformed relative to the positions;
   the projection data are evaluated by means of the transformed trajectory functions with respect to at least one property of the object.

12. A test facility for determination and evaluation of projection data of an object being examined, the test facility comprising:

projection source for radiation of an object being examined from a multiplicity of projection positions lying on a trajectory;

a detector to determine projection data of the object; and an evaluation device for evaluation of projection data of an objected being examined, the evaluation device being configured such that:

projection data of an object being examined are provided which are determined along a trajectory in a multiplicity of projection positions relative to a co-ordinate origin;

a respective trajectory function is determined for the projection positions for each of a multiplicity of positions from a reconstruction region of dimension n by:

establishing an offset, which corresponds to a value of a scalar product between one of the positions and one of the projection positions, and a direction vector at the co-ordinate origin;

establishing a hyperplane of dimension n−1 which extends perpendicular to the direction vector and has the offset to the co-ordinate origin;

establishing a number of intersection points where the hyperplane intersects with the trajectory;

establishing a derivative vector of the trajectory according to its trajectory path and calculating the derivative vector in the projection position;

establishing an absolute value of a scalar product between the derivative vector and the position and dividing the absolute value by the number;

the trajectory functions in a frequency domain of dimension n are transformed relative to the positions;

the projection data are evaluated by means of the transformed trajectory functions with respect to at least one property of the object.

13. A computer program product, comprising a non-transitory computer-readable medium for storing program instructions to perform a method for evaluation of projection data of an object being examined, the method comprising the steps of:

providing projection data of an object being examined which are determined along a trajectory in a multiplicity of projection positions relative to a co-ordinate origin;

determining a respective trajectory function for the projection positions, for each of a multiplicity of positions from a reconstruction region of dimension n by:

establishing an offset, which corresponds to a value of a scalar product between one of the positions and one of the projection positions, and a direction vector at the co-ordinate origin;

establishing a hyperplane of dimension n−1 which extends perpendicular to the direction vector and the hyperplane has the offset to the co-ordinate origin;

establishing a number of intersection points where the hyperplane intersects with the trajectory;

establishing a derivative vector of the trajectory according to its trajectory path and calculating the derivative vector in the projection position;

establishing an absolute value of a scalar product between the derivative vector and the position and dividing the absolute value by the number of intersection points;

transforming the trajectory functions into a frequency domain of dimension n relative to the positions;

evaluating the projection data by means of the transformed trajectory functions with respect to at least one property of the object.

14. The method according to claim 1, wherein an image of at least a portion of the object is generated based on at least said projection data.

15. The method according to claim 14, further comprising:

providing a projection source, the projection source emitting a beam in a direction of the object;

providing a detector, the detector determining the projection data based on at least the beam emitted in the direction of the object.

16. The evaluation device according to claim 11, wherein an image of at least a portion of the object is generated based on at least said projection data.

17. The evaluation device according to claim 14, wherein a detector determines the projection data based on at least a beam emitted in the direction of the object via a projection source.

18. The test facility according to claim 12, wherein the object is arranged between the detector and the projection source.

19. The test facility according to claim 12, wherein the evaluation device is operatively connected to the detector and the projection source.

* * * * *